US012789752B2

(12) United States Patent
Kim et al.

(10) Patent No.: US 12,789,752 B2
(45) Date of Patent: Nov. 10, 2026

(54) METHOD OF CONTROLLING VEHICLE DOOR

(71) Applicants: HYUNDAI MOTOR COMPANY, Seoul (KR); KIA CORPORATION, Seoul (KR)

(72) Inventors: Gwangseob Kim, Hwaseong-si (KR); HyeonSeob Kim, Hwaseong-si (KR); Seungmin Kim, Hwaseong-si (KR); Jungmo Yu, Hwaseong-si (KR); KyungHyun Lim, Hwaseong-si (KR); SangLok Song, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 39 days.

(21) Appl. No.: 18/968,054

(22) Filed: Dec. 4, 2024

(65) Prior Publication Data

US 2025/0368161 A1 Dec. 4, 2025

(30) Foreign Application Priority Data

May 31, 2024 (KR) ........................ 10-2024-0071257

(51) Int. Cl.

| | |
|---|---|
| ***B60R 25/00*** | (2013.01) |
| ***B60R 25/01*** | (2013.01) |
| ***B60R 25/24*** | (2013.01) |
| ***B60R 25/32*** | (2013.01) |
| ***E05B 81/56*** | (2014.01) |
| ***E05B 81/72*** | (2014.01) |
| ***E05F 15/77*** | (2015.01) |
| *B60R 25/102* | (2013.01) |

(52) U.S. Cl.

CPC ............ *B60R 25/245* (2013.01); *B60R 25/01* (2013.01); *B60R 25/32* (2013.01); *E05B 81/56* (2013.01); *E05B 81/72* (2013.01); *E05F 15/77* (2015.01); *B60R 25/102* (2013.01); *E05Y 2400/81* (2013.01); *E05Y 2900/531* (2013.01); *E05Y 2900/548* (2013.01)

(58) Field of Classification Search

None

See application file for complete search history.

(56) References Cited

U.S. PATENT DOCUMENTS 11,080,953 B2 * 8/2021 Kim .................... E05B 47/0001
12,180,770 B2 * 12/2024 Castonguay ............ E05B 83/12

(Continued)

*Primary Examiner* — Truc M Do

(74) *Attorney, Agent, or Firm* — MCDONNELL BOEHNEN HULBERT & BERGHOFF LLP

(57) ABSTRACT

A method of controlling a door of a cargo compartment mounted at the rear of a cab includes detecting whether a digital key is away from the vehicle by a predetermined distance or more via communication between a short range communication terminal provided in the vehicle and a mobile device used by a user of the vehicle as a digital key, setting a flag value when the digital key is away from the vehicle by the predetermined distance or more, and determining whether the cargo compartment is mounted at the rear of the cab, When it is determined that the cargo compartment is mounted at the rear of the cab, and when it is determined that the vehicle is stopped, the door is in the open state, and the flag value is set, closing the door. The method further includes notifying the user whether the door is closed.

12 Claims, 9 Drawing Sheets

(56) References Cited

U.S. PATENT DOCUMENTS

| | | | | |
|---|---|---|---|---|
| 2016/0019497 | A1* | 1/2016 | Carvajal | G01C 21/34 705/333 |
| 2022/0072991 | A1* | 3/2022 | Jeong | B60Q 1/0023 |
| 2022/0242369 | A1* | 8/2022 | Qiao | B60R 25/209 |
| 2023/0182671 | A1* | 6/2023 | Oya | E05F 15/73 382/104 |

* cited by examiner

METHOD OF CONTROLLING VEHICLE DOOR

CROSS REFERENCE TO RELATED APPLICATIONS

This application claims priority to and the benefit of Korean Patent Application No. 10-2024-0071257 filed in the Korean Intellectual Property Office on May 31, 2024, the entire contents of which are incorporated herein by reference.

BACKGROUND

(a) Field

The disclosure relates to a vehicle door control method, and more particularly to a vehicle door control method for controlling a door of a cargo compartment mounted at the rear of a cab for loading cargo, in a chassis-cab platform-based vehicle.

(b) Description of the Related Art

A Purpose Built Vehicle (PBV) is a modular mobility vehicle based on electrification, which may be defined as a means of transportation based on personalized design according to the purpose of use. In other words, the PBV is a vehicle that is designed and manufactured for a specific purpose or requirement and has a special function or use in view, unlike a general passenger vehicle. Among them, chassis-cab platform-based vehicles, which are vehicles formed of a chassis and a passenger cabin, are attracting attention as platform vehicles that are expandable into various forms depending on the purpose of use. For example, a chassis-cab platform-based vehicle may be converted into various forms, such as a cargo vehicle, a refrigerated cargo vehicle, a police operations vehicle, an emergency rescue vehicle, and a camping vehicle. These vehicles are also evolving into software-defined vehicles (SDVs) with enhanced software capabilities.

SUMMARY

The present disclosure attempts to provide a vehicle door control method that is capable of controlling a door installed in a cargo compartment in a chassis cab platform-based vehicle mounted with a cargo compartment for loading cargo based on a behavior of a user possessing a digital key.

An example embodiment of the present disclosure provides a vehicle door control method of controlling a door of a cargo compartment mounted at the rear of a cab for loading cargo, the vehicle door control method including detecting whether a digital key is away from the vehicle by a predetermined distance or more via communication between a short range communication terminal provided in the vehicle and a mobile device used by a user of the vehicle as a digital key, setting a flag value when it is detected that the digital key is away from the vehicle by the predetermined distance or more, determining whether the cargo compartment is mounted at the rear of the cab, when it is determined that the cargo compartment is mounted at the rear of the cab, determining whether the vehicle is stopped, the door is in an open state, and the flag value is set, when it is determined that the vehicle is stopped, the door is in the open state, and the flag value is set, closing the door, and notifying the user, via the mobile device, whether the door is successfully closed.

In some example embodiments, the determining of whether the cargo compartment is mounted at the rear of the cab may include when a voltage value of a connector pin provided on the cargo compartment falls within a first range, determining that the cargo compartment is mounted at the rear of the cab, and when a voltage value of a connector pin provided on the cargo compartment falls in a second range different from the first range, determining that the cargo compartment is not mounted at the rear of the cab.

In some example embodiments, the detecting of whether the digital key is away from the vehicle by the predetermined distance or more may include estimating a distance between the digital key and the short range communication terminal by using a Received Signal Strength Indicator (RSSI) value, and detecting whether the estimated distance is equal to or more than the predetermined distance.

In some example embodiments, the notifying the user, via the mobile device, whether the door is successfully closed may include monitoring an opening and closing state of the door after transmitting a request to close the door, when a result of the monitoring indicates that the door has changed to a closed state within a predetermined first time period, determining that the door is successfully closed, and when a result of the monitoring indicates that the door has not changed to the closed state within the first time period, determining that the door is not successfully closed.

In some example embodiments, the notifying the user, via the mobile device, whether the door is successfully closed may include: notifying the mobile device, via the short range communication terminal, whether the door is successfully closed.

In some example embodiments, the vehicle door control method may further include when the door is successfully closed, determining whether the digital key is located within the vehicle, when it is determined that the digital key is located within the vehicle, locking the door, and notifying the user, via the mobile device, whether the door is successfully locked.

In some example embodiments, the notifying the user, via the mobile device, whether the door is successfully locked may include monitoring a locked state of the door after transmitting a request to lock the door, when a result of the monitoring indicates that the door has changed to a locked state within a predetermined second time period, determining that the door is successfully locked, and when a result of the monitoring indicates that the door has not changed to the locked state within the second time period, determining that the door is not successfully locked.

In some example embodiments, the notifying the user, via the mobile device, whether the door is successfully locked may include notifying the mobile device, via the short range communication terminal, whether the door is successfully locked.

Another example embodiment of the present disclosure provides a vehicle door control method of controlling a door of a cargo compartment mounted at the rear of a cap for loading cargo, the vehicle door control method including detecting whether a digital key is closer to the vehicle by a predetermined first distance or less via communication between a short range communication terminal provided in the vehicle and a mobile device used by a user of the vehicle as a digital key, setting a first flag value when it is detected that the digital key is closer to the vehicle by the predetermined first distance or less, determining whether the cargo compartment is mounted at the rear of the cab, when it is determined that the cargo compartment is mounted at the rear of the cab, determining whether the vehicle is stopped, the door is in a locked state, and the first flag value is set, when it is determined that the vehicle is stopped, the door is in the locked state, and the first flag value is set, unlocking the door, and notifying the user, via the mobile device, whether the door is successfully unlocked.

In some example embodiments, the determining of whether the cargo compartment is mounted at the rear of the cab may include when a voltage value of a connector pin provided on the cargo compartment falls within a first range, determining that the cargo compartment is mounted at the rear of the cab, and when a voltage value of a connector pin provided on the cargo compartment falls in a second range different from the first range, determining that the cargo compartment is not mounted at the rear of the cab.

In some example embodiments, the detecting of whether the digital key is closer to the vehicle by the predetermined first distance or less may include estimating a distance between the digital key and the short range communication terminal by using a Received Signal Strength Indicator (RSSI) value, and detecting whether the estimated distance is equal to or less than the predetermined first distance.

In some example embodiments, the notifying the user, via the mobile device, whether the door is successfully unlocked may include monitoring a locked state of the door after transmitting a request to unlock the door, when a result of the monitoring indicates that the door has changed to an unlocked state within a predetermined first time period, determining that the door is successfully unlocked, and when a result of the monitoring indicates that the door has not changed to the unlocked state within the first time period, determining that the door is not successfully unlocked.

In some example embodiments, the notifying the user, via the mobile device, whether the door is successfully unlocked may include: notifying the mobile device, via the short range communication terminal, whether the door is successfully unlocked.

In some example embodiments, the vehicle door control method may further include setting a second flag value when it is detected that the digital key is closer to the vehicle by the predetermined second distance or less that is smaller than the first distance, determining whether the vehicle is stopped, the door is a closed state, and the second flag value is set, when it is determined that the vehicle is stopped, the door is in the closed state, and the second flag value is set, opening the door, and notifying the user, via the mobile device, whether the door is successfully opened.

In some example embodiments, the notifying the user, via the mobile device, whether the door is successfully opened may include monitoring an opening and closing state of the door after transmitting a request to open the door, when a result of the monitoring indicates that the door has changed to an open state within a predetermined second time period, determining that the door is successfully opened, and when a result of the monitoring indicates that the door has not changed to the open state within the second time period, determining that the door is not successfully opened.

In some example embodiments, the notifying the user, via the mobile device, whether the door is successfully opened may include: notifying the mobile device, via the short range communication terminal, whether the door is successfully opened.

Still another example embodiment of the present disclosure provides a vehicle door control method of controlling a door of a cargo compartment mounted at the rear of a cap for loading cargo, the vehicle door control method including detecting whether a digital key is closer to the vehicle by a predetermined distance or less via communication between a short range communication terminal provided in the vehicle and a mobile device used by a user of the vehicle as a digital key, setting a first flag value when it is detected that the digital key is closer to the vehicle by the predetermined distance or less; when the vehicle arrives at a destination, setting a second flag value, determining whether the cargo compartment is mounted at the rear of the cab, when it is determined that the cargo compartment is mounted at the rear of the cab, determining whether the vehicle is stopped, a driver's seat belt is not fastened, the user is not seated in a driver's seat, a driver's seat door open event has occurred, a stop event has occurred, and the first flag value and the second flag value are set, when it is determined that the vehicle is stopped, the driver's seat belt is not fastened, the user is not seated in the driver's seat, the driver's seat door open event has occurred, the stop event has occurred, and the first flag value and the second flag value are set, opening the door, and notifying the user, via the mobile device, whether the door is successfully opened.

In some example embodiments, the determining of whether the cargo compartment is mounted at the rear of the cab may include when a voltage value of a connector pin provided on the cargo compartment falls within a first range, determining that the cargo compartment is mounted at the rear of the cab, and when a voltage value of a connector pin provided on the cargo compartment falls in a second range different from the first range, determining that the cargo compartment is not mounted at the rear of the cab.

In some example embodiments, the notifying the user, via the mobile device, whether the door is successfully opened may include: monitoring an opening and closing state of the door after transmitting a request to open the door, when a result of the monitoring indicates that the door has changed to an open state within a predetermined first time period, determining that the door is successfully opened, and when a result of the monitoring indicates that the door has not changed to the open state within the first time period, determining that the door is not successfully opened.

In some example embodiments, the notifying the user, via the mobile device, whether the door is successfully opened may include: notifying the mobile device, via the short range communication terminal, whether the door is successfully opened.

DETAILED DESCRIPTION

Figure 1:
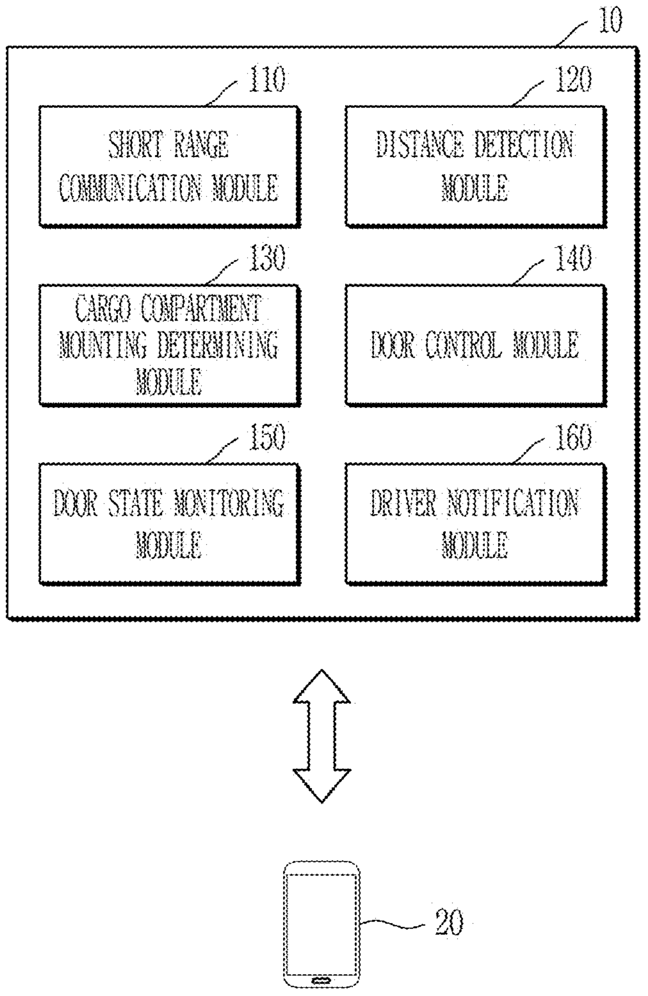
FIG. 1 is a block diagram for illustrating a vehicle door control apparatus according to an example embodiment.

Hereinafter, the present disclosure will be described more fully hereinafter with reference to the accompanying drawings, in which example embodiments of the disclosure are shown. As those skilled in the art would realize, the described example embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification and claims, unless explicitly described to the contrary, the word "comprise", and variations such as "comprises" or "comprising", will be understood to imply the inclusion of stated elements but not the exclusion of any other elements. Terms including an ordinary number, such as first and second, are used for describing various components, but the components are not limited by the terms. The terms are used only to discriminate one component from another component.

Terms such as "part," "unit," "module," and the like in the specification may refer to a unit capable of performing at least one function or operation described herein, which may be implemented in hardware or circuitry, software, or a combination of hardware or circuitry and software. In addition, at least some of the configurations or functions of a vehicle door control method and apparatus according to the example embodiments described below may be implemented as programs or software, and the programs or software may be stored on a computer-readable medium.

FIG. 1 is a block diagram for illustrating a vehicle door control apparatus according to an example embodiment.

Referring to FIG. 1, a vehicle door control apparatus 10 according to an example embodiment may execute program codes loaded into one or more memory devices via one or more processors. For example, the vehicle door control apparatus 10 may be implemented as a computing device 50, such as that described later with reference to FIG. 9. In this case, the one or more processors may correspond to a processor 510 of the computing device 50, and the one or more memory devices may correspond to a memory 530 of the computing device 50. The program code may be executed by one or more processors to control a door based on a behavior of a user possessing a digital key in a chassis cab platform-based vehicle mounted with a cargo compartment (e.g., a tower for loading cargo) for loading cargo. The term "module" is used herein to logically distinguish between these functions executed by the program code. In some example embodiments, the vehicle door control apparatus 10 may be implemented in a chassis-cab platform-based vehicle formed of a chassis and a passenger cabin.

The vehicle door control apparatus 10 according to the example embodiment may execute program code including a short range communication module 110, a distance detection module 120, a cargo compartment mounting determining module 130, a door control module 140, a door state monitoring module 150, and a driver notification module 160. As used in the present specification, the term "driver" is not intended to be limited to the person directly operating the vehicle. Therefore, when the term "driver" is used, the scope of the term is intended to include any user who possesses a digital key and wishes to control the doors of the vehicle. In this specification, the term "driver" may be used interchangeably with the term "user."

The short range communication module 110 may establish communication between a short range communication terminal provided in the vehicle and a mobile device 20 used by the user (for example, a driver) of the vehicle as a digital key, and may handle the process of communication between the short range communication terminal and the mobile device 20. In some example embodiments, the short range communication terminal may include a Bluetooth® beacon.

When the short range communication terminal is implemented as a Bluetooth beacon, the beacon may be a wireless transmission device that periodically transmits specific information based on Bluetooth Low Energy (BLE) technology. A signal transmitted by the beacon may be received by the mobile device 20 capable of detecting the corresponding signal, and the corresponding signal may include unique identification information of the beacon, and the mobile device 20 may identify the beacon based on the unique identification information.

Here, the digital key may provide a function to control the vehicle or implement interaction with the vehicle by using the mobile device 20. For example, a user may be able to lock or unlock the doors of the vehicle, remotely start the engine of the vehicle, or remotely control the air conditioner, horn, lights, and the like by using the possessed digital key via the mobile device 20. Further, as users specify user profiles, vehicle settings customized for each user, such as seat positioning, mirror positioning, and cabin temperature settings. may be automatically applied.

In some example embodiments, the mobile device 20 may include a smartphone, tablet computer, wearable device, laptop computer, or the like, but is not limited to those listed.

The distance detection module 120 may detect a change in distance between the digital key and the vehicle via communication of the mobile device 20 with the short range communication terminal performed by the short range communication module 110. For example, the distance detection module 120 may detect, via communication between the short range communication terminal and the mobile device 20, whether the digital key is away from the vehicle by a predetermined distance or more. Alternatively, the distance detection module 120 may detect, via the communication between the short range communication terminal and the mobile device 20, whether the digital key is closer to the vehicle by a predetermined distance or less.

In some example embodiments, the distance detection module 120 may estimate a distance between the digital key and the short range communication terminal by using a Received Signal Strength Indicator (RSSI) value, and may detect when the estimated distance is equal to or more than a predetermined distance, or may detect when the estimated distance is equal to or less than a predetermined distance. RSSI is an indicator of signal strength measured when receiving a wireless signal, and when a short range communication terminal periodically transmits a signal, the mobile device 20 may measure the strength of the corresponding signal, thereby estimating the distance between the mobile device 20 and the short range communication terminal. AS needed, implementations, such as increasing the number of times of the measurement or using average values, may be used to compensate for signal interference, such as obstacles, or multipath effects where the signal may be distorted by the signal reaching the mobile device 20 via multiple paths.

When it is detected that the digital key is away from the vehicle by the predetermined distance or more, or when it is detected that the digital key is closer to the vehicle by the predetermined distance or less, the distance detection module 120 may set a flag value to represent the case.

The cargo compartment mounting determining module 130 may determine whether the cargo compartment (e.g., a cargo compartment for loading cargo) is mounted at the rear of the cab, that is, at the rear of the passenger cabin. Since the chassis cab platform-based vehicle may be operated without being mounted with a cargo compartment, it is necessary to recognize whether the rear of the cab is mounted with the cargo compartment in order to control the door of the cargo compartment, as described in the following example embodiments.

In some example embodiments, the cargo compartment mounting determining module 130 may determine that the cargo compartment is mounted at the rear of the cab when a voltage value on a connector pin provided on the cargo compartment falls within a first range. For example, the cargo compartment mounting determining module 130 may determine that the cargo compartment is not mounted at the rear of the cab when the voltage value of a connector pin provided on the cargo compartment is measured to be a value in a range of 8 V or more. On the other hand, the cargo compartment mounting determining module 130 may determine that the cargo compartment is not mounted at the rear of the cab when the voltage value of the connector pin provided on the cargo compartment falls within a second range that is different from the first range. For example, the cargo compartment mounting determining module 130 may determine that the cargo compartment is mounted at the rear of the cab when the voltage value of the connector pin provided on the cargo compartment is measured to be a value in a range of 0.5 V or less.

The door control module 140 may control the door installed in the cargo compartment in consideration of at least one of a condition regarding the state of the vehicle, a condition regarding the state of the door, a condition regarding whether a flag value is set, and various other conditions. For example, the door control module 140 may close the door when it is determined that the vehicle is stopped, the door is in the open state, and it is detected that the digital key is away from the vehicle by the predetermined distance or more and the flag value is set. As another example, the door control module 140 may unlock the door when it is determined that the vehicle is stopped, the door is in the locked state, and it is detected that the digital key is closer to the vehicle by the predetermined distance or less and the flag value is set. As another example, the door control module 140 may open the door when it is determined that the vehicle is stopped, the door is in the closed state, and it is detected that the digital key is closer to the vehicle by the predetermined distance or less and the flag value is set. In another example, the door control module 140 may open the door of the vehicle when the vehicle is stopped, the driver's seat belt is not fastened, the driver is not seated in the driver's seat, a driver's seat door open event has occurred, a stop event has occurred, it is detected that the digital key is closer by the predetermined distance or less from the vehicle and the first flag value is set, and the vehicle has arrived at a destination and a second flag value is set.

The door state monitoring module 150 may monitor whether the door is controlled as requested by the door control module 140. For example, the door state monitoring module 150 may monitor the open and close state or locked state of the door after the door control module 140 transmits a request to close the door, a request to lock the door, a request to unlock the door, or a request to open the door, and may determine that the door is successfully closed, successfully locked, successfully unlocked, or successfully opened when the monitoring results indicate that the door has changed to the closed state, the locked state, the unlocked state, or the open state within a predetermined time period. Alternatively, when the monitoring results indicate that the door has not changed to the closed state, locked state, unlocked state, or open state within the predetermined time period, the door state monitoring module 150 may determine that the door is not successfully closed, not successfully locked, not successfully unlocked, or not successfully opened.

The driver notification module 160 may notify the driver, via the mobile device 20, of the results monitored by the door state monitoring module 150. For example, the driver notification module 160 may notify the driver, via the mobile device 20, whether the door was successfully closed, whether the door was successfully locked, whether the door was successfully unlocked, or whether the door was successfully opened.

In some example embodiments, the driver notification module 160 may notify the mobile device 20 of the monitoring results via the short range communication terminal. For example, the driver notification module 160 may notify the mobile device 20, via the short range communication terminal, whether the door was successfully closed, whether the door was successfully locked, whether the door was successfully unlocked, or whether the door was successfully opened.

Figure 2:
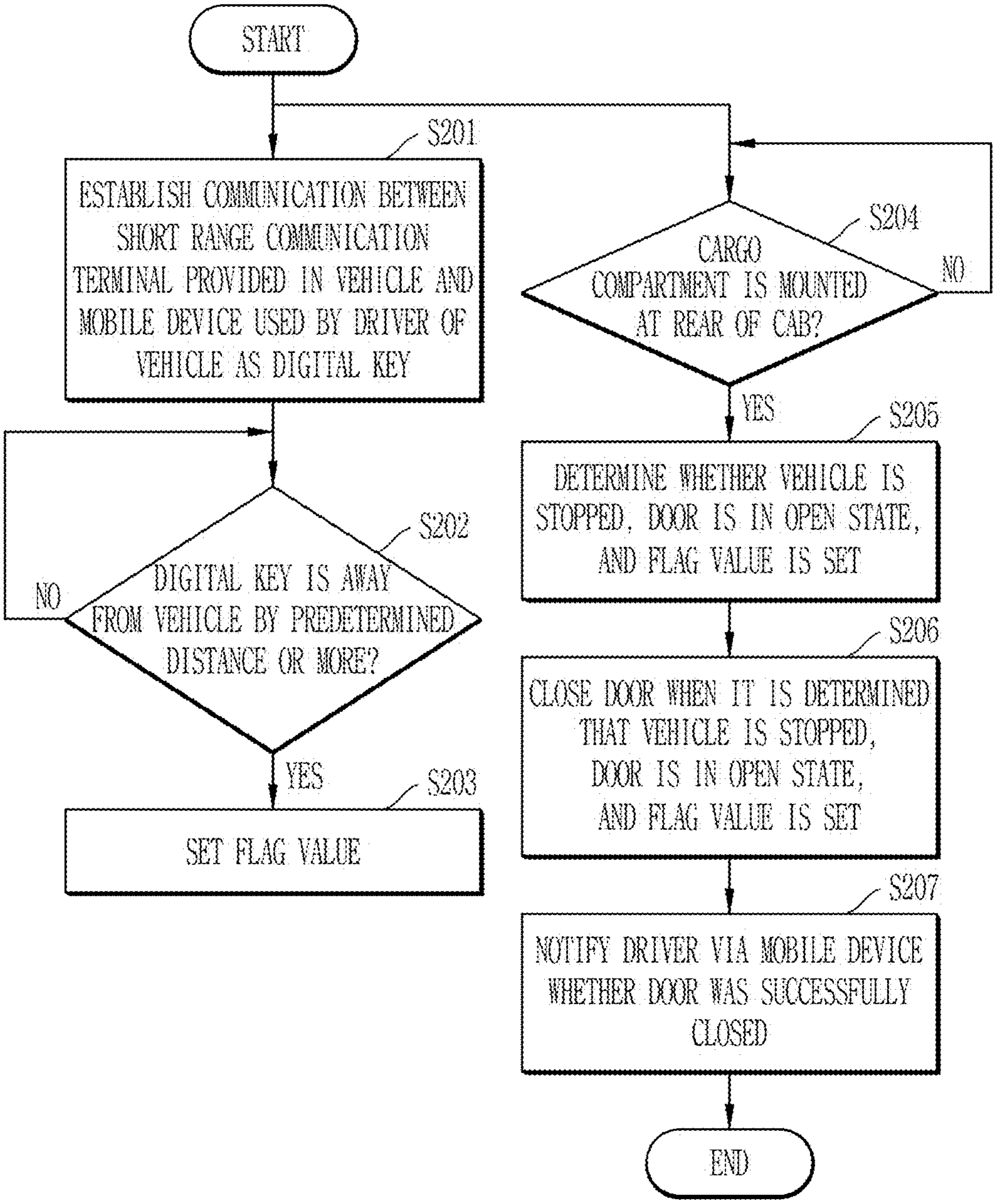
FIG. 2 is a flow diagram for illustrating a vehicle door control method according to an example embodiment.

FIG. 2 is a flow diagram for illustrating a vehicle door control method according to an example embodiment.

Referring to FIG. 2, a vehicle door control method according to an example embodiment may perform establishing communication between a short range communication terminal provided in a vehicle and a mobile device used by a driver of the vehicle as a digital key S201, and detecting whether the digital key is away from the vehicle by a predetermined distance or more S202. For example, operation S202 may perform detecting whether the digital key is away from the vehicle by 4.5 m or more, or detecting whether the digital key is away from the vehicle to a range of 4.5 m±0.5 m. In some example embodiments, the driver may set a distance value or a range value, via the User Setting Mode (USM), for the case where the digital key is away from the vehicle by a certain distance or more and is detected, or when the digital key is away from the vehicle to a certain range and is detected. In some example embodiments, operation S202 may be implemented by the method of estimating the distance between the digital key and the short range communication terminal by using the RSSI value, as previously described with respect to FIG. 1. The vehicle door control method may perform, when it is detected that the digital key is away from the vehicle by the predetermined distance or more S202, 'Y', setting a flag value S203, and when not S202, 'N', the vehicle door control method may perform operation S202 again.

On the other hand, the vehicle door control method may perform determining whether the cargo compartment is mounted at the rear of the cab S204. In some example embodiments, operation S204 may be implemented by the method of determining whether the cargo compartment is mounted based on a voltage value of a connector pin provided on the cargo compartment, as previously described with reference to FIG. 1. When it is determined that the cargo compartment is mounted at the rear of the cab S204, 'Y', the vehicle door control method may perform determining whether the vehicle is stopped, the door is in the open state, and the flag value is set S205, and when not S204, 'N', the vehicle door control method may perform operation S204 again.

Subsequently, the vehicle door control method may perform closing the door when it is determined that the vehicle is stopped, the door is in an open state, and the flag value is set S206, and notifying the driver, via the mobile device 20, whether the door was successfully closed S207.

In some example embodiments, operation S207 may include: monitoring the opening and closing state of the door after transmitting a request to close the door; determining that the door is successfully closed when the monitoring results indicate that the door has changed to the closed state within a predetermined first time period (e.g., 10 seconds); and determining that the door is not successfully closed when the monitoring results indicate that the door has not changed to the closed state within the first time period (e.g., 10 seconds). On the other hand, in some example embodiments, operation S207 may include notifying the mobile device 20, via the short range communication terminal, whether the door was successfully closed.

According to the example embodiment, it is possible to provide automated door control in which a door (e.g., a power sliding door) installed in the cargo compartment is automatically closed when a user with a digital key walks away from the vehicle, thereby meeting the user's needs without directly closing a door by the user.

Figure 3:
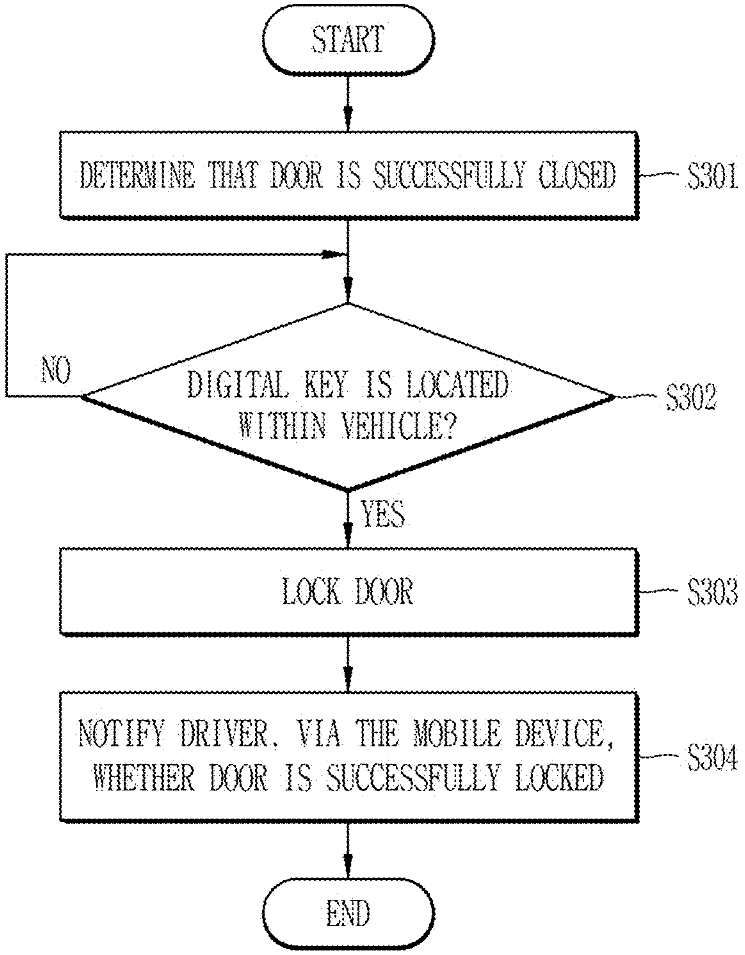
FIG. 3 is a flow diagram for illustrating the vehicle door control method according to the example embodiment.

FIG. 3 is a flow diagram for illustrating the vehicle door control method according to the example embodiment.

Referring to FIG. 3, the vehicle door control method according to the example embodiment may perform: determining that the door is successfully closed by operation S206 of FIG. 2 S301. When the door is successfully closed, the method includes determining that the digital key is located within the vehicle S302. When the digital key is determined to be located within the vehicle S302, 'Y', the vehicle door control method may perform locking the door S303, and notifying the driver, via the mobile device 20, whether the door is successfully locked S304.

In some example embodiments, operation S304 may include: monitoring a locked state of the door after transmitting a request to lock the door; determining that the door is successfully locked when the monitoring results indicate that the door has changed to the locked state within a predetermined second time period (e.g., two seconds), and determining that the door is not successfully locked when the monitoring results indicate that the door has not changed to the locked state within the second time period (e.g., two seconds). On the other hand, in some example embodiments, operation S304 may include notifying the mobile device 20, via the short range communication terminal, whether the door was successfully locked.

According to the example embodiment, it is possible to provide automated door control in which a door (e.g., a power sliding door) installed in the cargo compartment is automatically closed when a user with a digital key walks away from the vehicle, and subsequently it is determined that the digital key is not located within the vehicle, and the door is automatically locked, thereby meeting the user's needs without the need for the user to directly close or lock the door.

Figure 4:
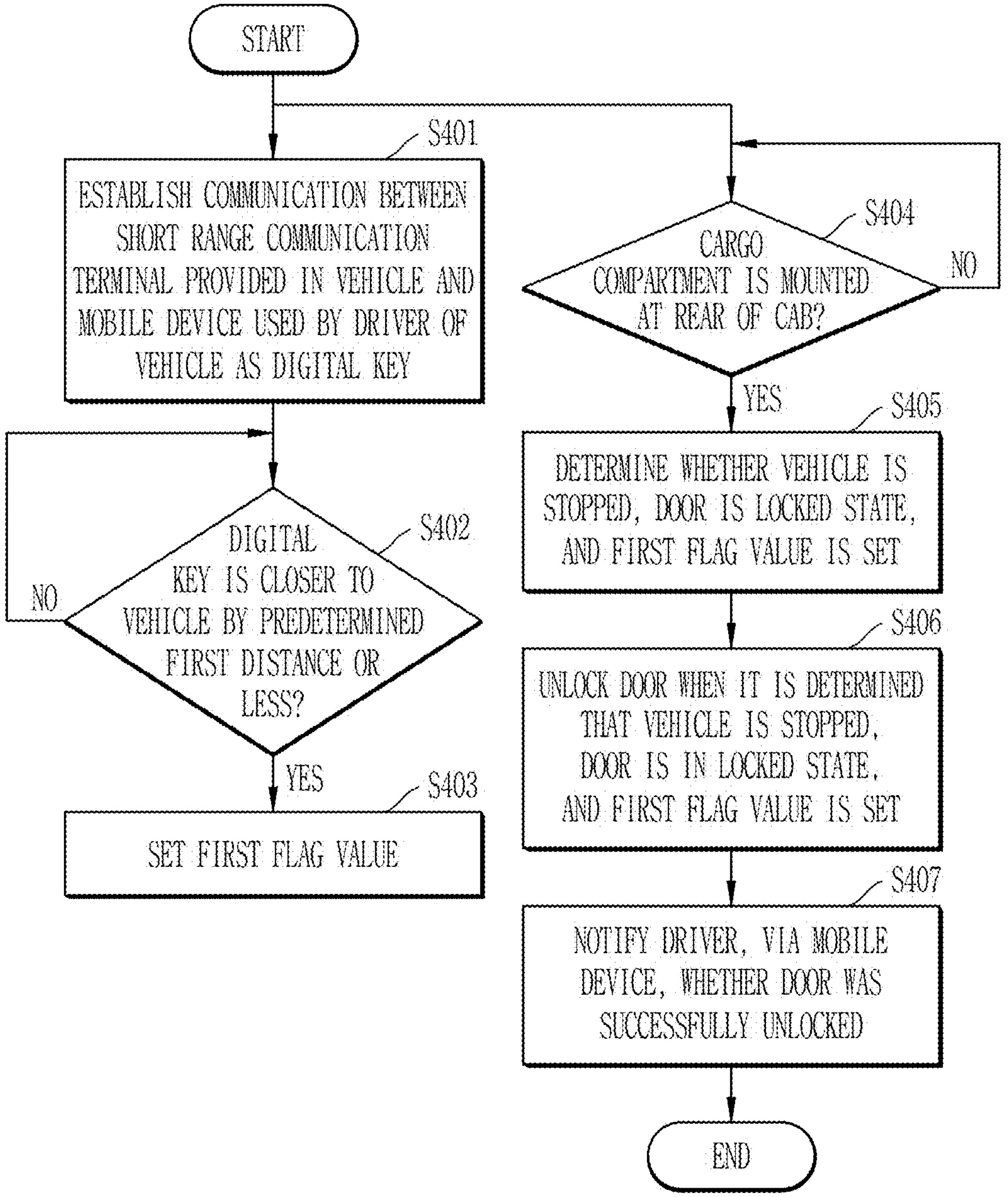
FIG. 4 is a flow diagram for illustrating the vehicle door control method according to the example embodiment.

FIG. 4 is a flow diagram for illustrating the vehicle door control method according to the example embodiment.

Referring to FIG. 4, the vehicle door control method according to the example embodiment may include establishing communication between the short range communication terminal provided in the vehicle and the mobile device used by the driver of the vehicle as the digital key S401, and detecting whether the digital key is closer to the vehicle by a predetermined first distance or less S402. For example, operation S402 may include detecting whether the digital key is closer to the vehicle by 2.0 m or less, or detecting whether the digital key is closer to the vehicle to a range of 2.0 m±0.5 m. In some example embodiments, the driver may set a distance value or a range value, via the USM, for the case where the digital key is away from the vehicle by a certain distance or more and is detected, or when the digital key is away from the vehicle to a certain range and is detected. In some example embodiments, operation S402 may be implemented by the method of estimating the distance between the digital key and the short range communication terminal by using the RSSI value, as previously described with respect to FIG. 1. The vehicle door control method may perform, when it is detected that the digital key is closer to the vehicle by the predetermined first distance or less S402, 'Y', setting a first flag value S403, and when not S402, 'N', the vehicle door control method may perform operation S402 again.

On the other hand, the vehicle door control method may include determining whether the cargo compartment is mounted at the rear of the cab S404. In some example embodiments, operation S404 may be implemented by the method of determining whether the cargo compartment is mounted based on a voltage value of the connector pin provided on the cargo compartment, as previously described with reference to FIG. 1. When it is determined that the cargo compartment is mounted at the rear of the cab S404, 'Y', the vehicle door control method may perform determining whether the vehicle is stopped, the door is a locked state, and the first flag value is set S405, and when not S404, 'N', the vehicle door control method may perform operation S404 again.

Subsequently, the vehicle door control method may perform unlocking the door when it is determined that the vehicle is stopped, the door is in the locked state, and the first flag value is set S406, and notifying the driver, via the mobile device 20, whether the door was successfully unlocked S407.

In some example embodiments, operation S407 may include: monitoring the locked state of the door after transmitting a request to unlock the door; determining that the door is successfully unlocked when the monitoring results indicate that the door has changed to the unlocked state within a predetermined first time period (e.g., two seconds); and determining that the door is not successfully unlocked when the monitoring results indicate that the door has not changed to the unlocked state within the first time period (e.g., two seconds). On the other hand, in some example embodiments, operation S404 may include notifying the mobile device 20, via the short range communication terminal, whether the door was successfully unlocked.

According to the example embodiment, it is possible to provide automated door control in which a door (e.g., a power sliding door) installed in the cargo compartment is automatically unlocked when a user with a digital key walks close to the vehicle, thereby meeting the user's needs without the need for the user to directly unlock the door.

Figure 5:
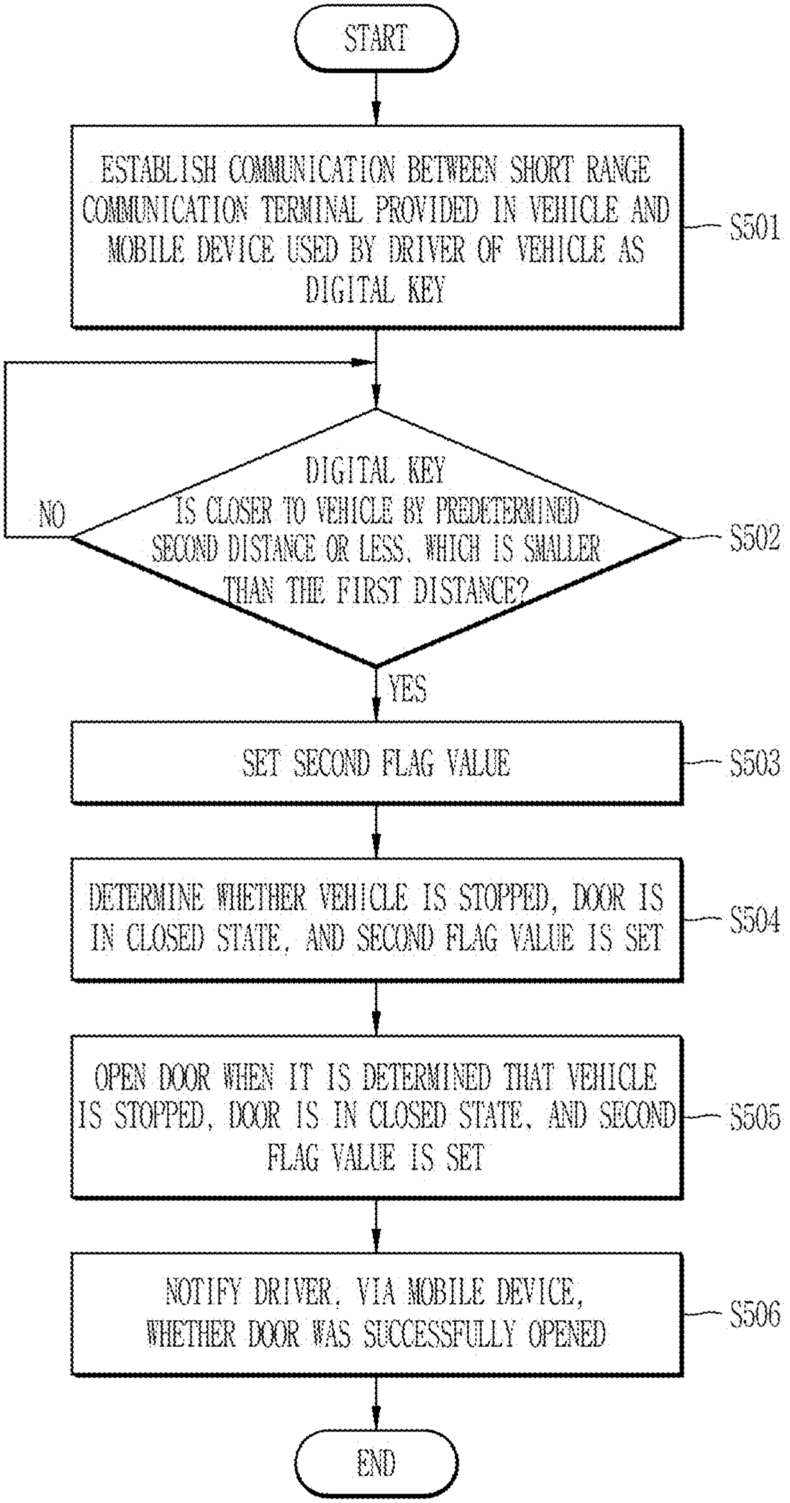
FIG. 5 is a flow diagram for illustrating the vehicle door control method according to the example embodiment.

FIG. 5 is a flow diagram for illustrating the vehicle door control method according to the example embodiment.

Referring to FIG. 5, the vehicle door control method according to the example embodiment may include establishing communication between the short range communication terminal provided in the vehicle and the mobile device used by the driver of the vehicle as the digital key S501, and detecting whether the digital key is closer to the vehicle by a predetermined second distance or less (e.g., in the range of 2.0 m or 2.0 m±0.5 m), which is smaller than the first distance of FIG. 4 S502. In some example embodiments, the driver may set a distance value or a range value, via the USM, for the case where the digital key is close to the vehicle by a certain distance or less and is detected, or when the digital key is close to the vehicle to a certain range and is detected. For example, operation S502 may include detecting whether the digital key is closer to the vehicle by 0.5 m or less, or detecting whether the digital key is closer to the vehicle to a range of 0.5 m±0.5 m. In some example embodiments, operation S502 may be implemented by the method of estimating the distance between the digital key and the short range communication terminal by using the RSSI value, as previously described with respect to FIG. 1. The vehicle door control method may perform, when it is detected that the digital key is closer to the vehicle by the predetermined second distance or less S502, 'Y', setting a second flag value S503, and when not S502, 'N', the vehicle door control method may perform operation S502 again.

Subsequently, the vehicle door control method may include determining whether the vehicle is stopped, the door is in the closed state, and the second flag value is set S504, opening the door when it is determined that the vehicle is stopped, the door is in the closed state, and the second flag value is set S505, and notifying the driver, via the mobile device 20, whether the door was successfully opened S506.

In some example embodiments, operation S506 may include: monitoring the opening and closing state of the door after transmitting a request to open the door; determining that the door is successfully opened when the monitoring results indicate that the door has changed to the open state within a predetermined second time period (e.g., 10 seconds); and determining that the door is not successfully opened when the monitoring results indicate that the door has not changed to the open state within the second time period (e.g., 10 seconds). On the other hand, in some example embodiments, operation S506 may include notifying the mobile device 20, via the short range communication terminal, whether the door was successfully opened.

According to the example embodiment, it is possible to provide automated door control in which a door (e.g., a power sliding door) installed in the cargo compartment is automatically unlocked and subsequently, the door is automatically open when a user with a digital key walks close to the vehicle, thereby meeting the user's needs without the need for the user to directly unlock or open the door.

Figure 6:
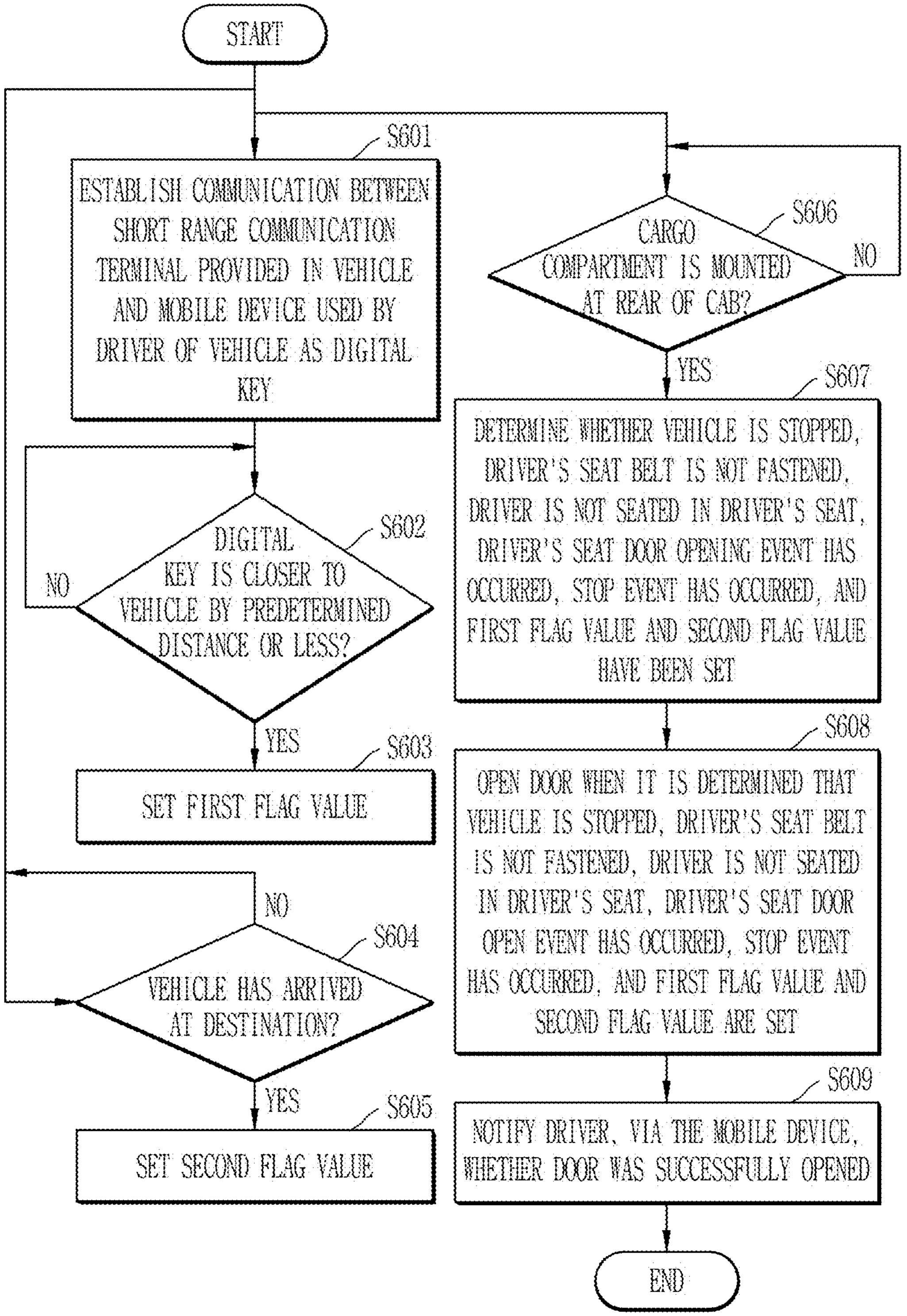
FIG. 6 is a flow diagram for illustrating the vehicle door control method according to the example embodiment.

FIG. 6 is a flow diagram for illustrating the vehicle door control method according to the example embodiment.

Referring to FIG. 6, the vehicle door control method according to the example embodiment may perform establishing communication between the short range communication terminal provided in the vehicle and the mobile device used by the driver of the vehicle as the digital key S601, and detecting whether the digital key is closer to the vehicle by a predetermined distance or less S602. For example, operation S602 may include detecting whether the digital key is closer to the vehicle by 0.3 m or less, or detecting whether the digital key is closer to the vehicle to a range of 0.3 m±0.3 m. In some example embodiments, the driver may set a distance value or a range value, via the USM, for the case where the digital key is close to the vehicle by a certain distance or less and is detected, or when the digital key is close to the vehicle to a certain range and is detected. In some example embodiments, operation S602 may be implemented by the method of estimating the distance between the digital key and the short range communication terminal by using the RSSI value, as previously described with respect to FIG. 1. The vehicle door control method may perform, when it is detected that the digital key is closer to the vehicle by the predetermined distance or less S602, 'Y', setting a first flag value S603, and when not S602, 'N', the vehicle door control method may perform operation S602 again.

In the meantime, the vehicle door control method may perform determining whether the vehicle has arrived at a destination S604. In some example embodiments, operation S604 may be implemented by a method of determining whether the vehicle has arrived at the destination based on destination information set by the driver or delivery schedule information provided from an external server, for example, based on current global positioning system (GPS) location information of the vehicle. If the vehicle is determined to have arrived at the destination S604, 'Y', the vehicle door control method may perform setting a second flag value S605, and when not S604, 'N', the vehicle door control method may perform operation S604 again.

In the meantime, the vehicle door control method may perform determining whether the cargo compartment is mounted at the rear of the cab S606. In some example embodiments, operation S606 may be implemented by the method of determining whether the cargo compartment is mounted based on a voltage value of the connector pin provided on the cargo compartment, as previously described with reference to FIG. 1. When it is determined that the cargo compartment is mounted at the rear of the cab S606, 'Y', the vehicle door control method may perform determining whether the vehicle is stopped, the driver's seat belt is not fastened, the driver is not seated in the driver's seat, the driver's seat door opening event has occurred, the stop event has occurred, and the first flag value and the second flag value have been set S607, and when not S606, 'N', the vehicle door control method may perform operation S606 again.

Subsequently, the vehicle door control method may perform opening the door when it is determined that the vehicle is stopped, the driver's seat belt is not fastened, the driver is not seated in the driver's seat, the driver's seat door open event has occurred, the stop event has occurred, and the first flag value and the second flag value are set S608, and notifying the driver, via the mobile device 20, whether the door was successfully opened S609. Here, the driver's seat door open event may be an event that occurs when the driver's seat door changes from the closed state to the open state after the vehicle is stopped, and the stop event may be an event that occurs when the vehicle is stopped after the vehicle speed is a predetermined speed (e.g., 20 k/h) or more.

In some example embodiments, operation S609 may include monitoring the opening and closing state of the door after transmitting a request to open the door, determining that the door is successfully opened when the monitoring results indicate that the door has changed to the open state within a predetermined first time period (e.g., 10 seconds), and determining that the door is not successfully opened when the monitoring results indicate that the door has not changed to the open state within the first time period (e.g., 10 seconds). On the other hand, in the meantime, in some example embodiments, operation S609 may include notifying the mobile device 20, via the short range communication terminal, whether the door was successfully opened.

According to the example embodiment, it is possible to provide automated door control in which a door (e.g., a power sliding door) installed in the cargo compartment is automatically opened when a vehicle of a user with a digital key arrives at a destination and the door of the driver's seat is open, thereby meeting the user's needs without the need for the user to directly open the door.

Figure 7:
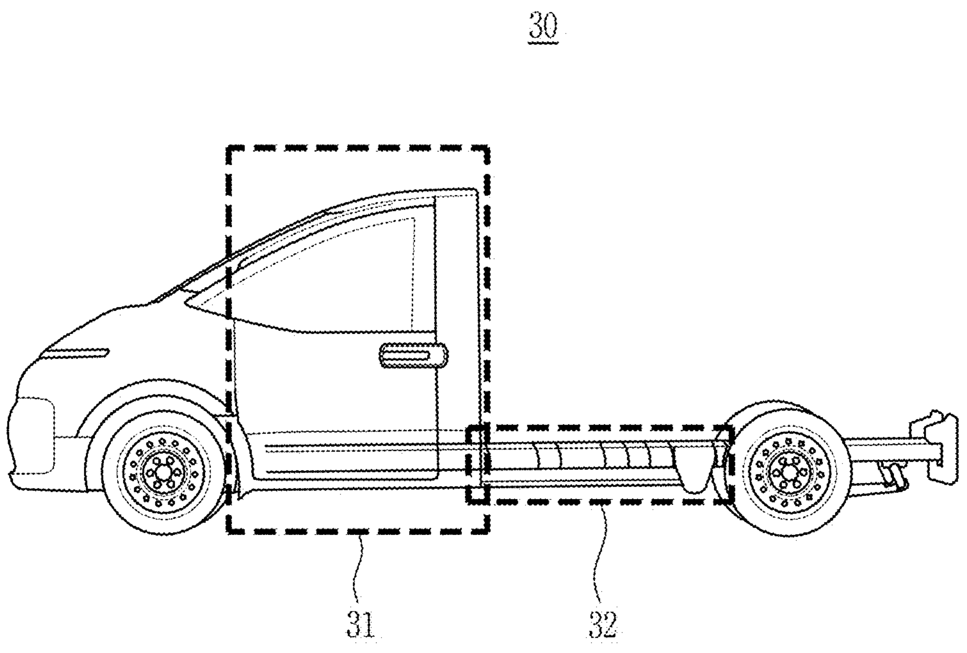
FIGS. 7 and 8 are diagrams for illustrating example implementations of the vehicle door control method and apparatus according to the example embodiment.
Figure 8:
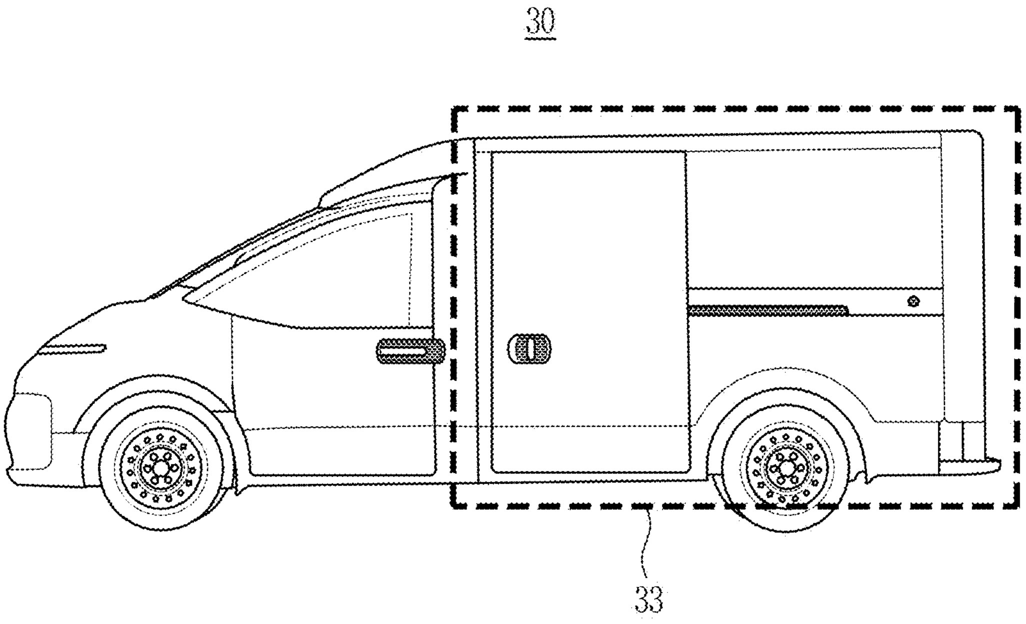

FIGS. 7 and 8 are diagrams for illustrating example implementations of the vehicle door control method and apparatus according to the example embodiment.

Referring to FIGS. 7 and 8, a chassis cab platform-based vehicle 30 may be a vehicle formed of a chassis 32 and a passenger cabin 31. The chassis cab platform-based vehicle 30 is a platform vehicle that may be expanded into various forms depending on the purpose of use, and may be mounted with a cargo compartment 33 for loading cargo, as illustrated in FIG. 8. According to the example embodiments, it is possible to determine whether the cargo compartment 33 is mounted at the rear of the cab, that is, at the rear of the passenger cabin, and to control the door installed in the cargo compartment 33 based on the behavior of a user possessing a digital key to provide convenience of door control.

Figure 9:
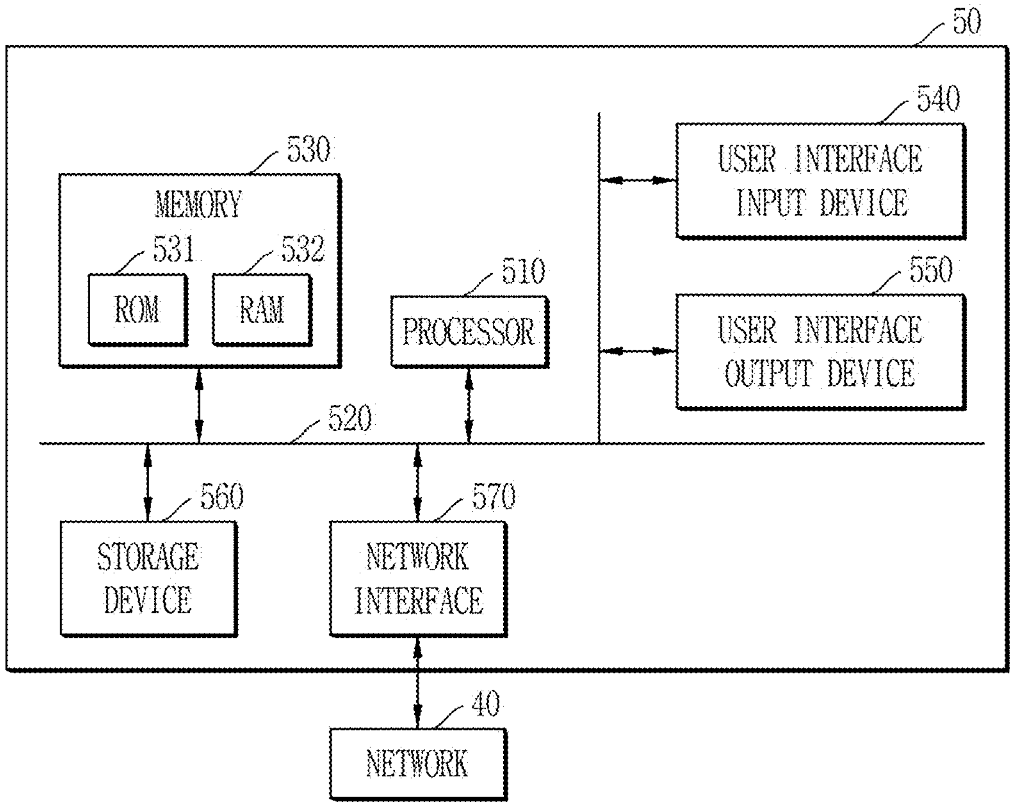
FIG. 9 is a diagram for illustrating a computing device according to an example embodiment.

FIG. 9 is a diagram illustrating a computing device according to an example embodiment.

Referring now to FIG. 9, the vehicle door control method and apparatus for according to the example embodiments may be implemented by using a computing device 50.

The computing device 50 may include at least one of a processor 510, a memory 530, a user interface input device 540, a user interface output device 550, and a storage device 560 communicating via a bus 520. The computing device 50 may also include a network interface 570 electrically connected to the network 40. The network interface 570 may transmit or receive a signal with another entity through the network 40.

The processor 510 may be implemented in various types, such as a micro controller unit (MCU), application processor (AP), a central processing unit (CPU), a graphic processing unit (GPU), a neutral processing unit (NPU), and a quantum processing unit (QPU), and may be a predetermined semiconductor device executing instructions stored in the memory 530 or the storage device 560. The processor 510 may be configured to implement the function and the methods described above with reference to FIGS. 1 to 8.

The memory 530 and the storage device 560 may include various forms of volatile or non-volatile storage media. For example, the memory may include a read only memory (ROM) 531 and a random access memory (RAM) 532. In some example embodiments, the memory 530 may be located inside or outside the processor 510, and the memory 530 may be connected with the processor 510 through already known various means.

In some example embodiments, at least some configurations or functions of the vehicle door control method and apparatus according to the example embodiments may be implemented as programs or software executed on the computing device 50, and the programs or software may be stored on a computer-readable medium. Specifically, a computer-readable medium according to the example embodiment may record a program for executing the operations included in an implementation of the vehicle door control method according to the example embodiments on a computer including the processor 510 executing a program or instructions stored in the memory 530 or the storage device 560.

In some example embodiments, at least some configurations or features of the vehicle door control method and apparatus according to the example embodiments may be implemented using hardware or circuit of the computing device 50, or may be implemented as separate hardware or circuit that may be electrically connected to computing device 50.

According to the example embodiments, it is possible to provide convenience in door control by controlling a door installed in a cargo compartment in a chassis cab platform-based vehicle mounted with a cargo compartment for loading cargo based on a behavior of a user possessing a digital key. It is possible to implement automated door control capable of meeting the need of a user without directly controlling a door by the user, like the case where a power sliding door installed in the cargo compartment may be automatically closed and locked when the user with the digital key moves away from the vehicle, the door may be automatically unlocked and opened when the user approaches the vehicle, or the door may be automatically opened when the user approaches the vehicle after arriving at the delivery destination.

Although the above example embodiments of the present disclosure have been described in detail, the scope of the present disclosure is not limited thereto, but also includes various modifications and improvements by one of ordinary skill in the art utilizing the basic concepts of the present disclosure as defined in the following claims.

The invention claimed is:

1. A vehicle door control method of controlling a vehicle door, wherein the vehicle door is a door of a cargo compartment mounted at a rear of a cab for loading cargo, the vehicle door control method comprising:

detecting whether a digital key is away from the vehicle by a predetermined distance or more via communication between a short range communication terminal provided in the vehicle and a mobile device used by a user of the vehicle as a digital key;

setting a flag value when the digital key is detected as away from the vehicle by the predetermined distance or more;

determining whether the cargo compartment is mounted at the rear of the cab;

when the cargo compartment is determined as mounted at the rear of the cab, determining whether the vehicle is stopped, whether the vehicle door is in an open state, and whether the flag value is set;

when the vehicle is determined to be stopped, the vehicle door is in the open state, and when the flag value is set, closing the vehicle door; and notifying the user, via the mobile device, whether the vehicle door is closed;

the vehicle door control method further comprising:

when the vehicle door is closed, determining whether the digital key is located within the vehicle;

when the digital key is located within the vehicle, locking the vehicle door; and notifying the user, via the mobile device, whether the vehicle door is locked;

wherein notifying the user, whether the vehicle door is locked includes:

monitoring a locked state of the vehicle door after transmitting a request to lock the vehicle door;

when the monitoring indicates that the vehicle door has changed to a locked state within a predetermined second time period, determining that the vehicle door is locked; and when the monitoring indicates that the vehicle door has not changed to the locked state within the predetermined second time period, determining that the vehicle door is not locked.

2. The vehicle door control method of claim 1, wherein determining whether the cargo compartment is mounted at the rear of the cab includes:

when a voltage value of a connector pin provided on the cargo compartment falls within a first range, determining that the cargo compartment is mounted at the rear of the cab; and when a voltage value of a connector pin provided on the cargo compartment falls in a second range different from the first range, determining that the cargo compartment is not mounted at the rear of the cab.

3. The vehicle door control method of claim 1, wherein detecting whether the digital key is away from the vehicle by the predetermined distance or more includes:

estimating a distance between the digital key and the short range communication terminal by using a Received Signal Strength Indicator (RSSI) value; and detecting whether the estimated distance is equal to or more than the predetermined distance.

4. The vehicle door control method of claim 1, wherein notifying the user whether the vehicle door is closed includes:

monitoring an opening and closing state of the vehicle door after transmitting a request to close the vehicle door;

when the monitoring indicates that the vehicle door has changed to a closed state within a predetermined first time period, determining that the vehicle door is closed; and when the monitoring indicates that the vehicle door has not changed to the closed state within the predetermined first time period, determining that the vehicle door is not closed.

5. The vehicle door control method of claim 1, wherein notifying the user, whether the vehicle door is closed includes:

notifying the mobile device, via the short range communication terminal, whether the vehicle door is closed.

6. The vehicle door control method of claim 1, wherein notifying the user, whether the vehicle door is locked includes:

notifying the mobile device, via the short range communication terminal, whether the vehicle door is locked.

7. A vehicle door control method of controlling a vehicle door, wherein the vehicle door is a door of a cargo compartment mounted at a rear of a cab for loading cargo, the vehicle door control method comprising:

detecting whether a digital key is closer to the vehicle by a predetermined first distance or less via communication between a short range communication terminal provided in the vehicle and a mobile device used by a user of the vehicle as a digital key;

setting a first flag value when the digital key is detected as closer to the vehicle by the predetermined first distance or less;

determining whether the cargo compartment is mounted at the rear of the cab;

when the cargo compartment is determined as mounted at the rear of the cab, determining whether the vehicle is stopped, whether the vehicle door is in a locked state, and whether the first flag value is set;

when the vehicle is determined to be stopped, the vehicle door is in the locked state, and the first flag value is set, unlocking the vehicle door; and notifying the user, via the mobile device, whether the vehicle door is unlocked;

the vehicle door control method further comprising:

setting a second flag value when the digital key is detected as closer to the vehicle by a predetermined second distance or less that is smaller than the predetermined first distance;

determining whether the vehicle is stopped, whether the vehicle door is a closed state, and whether the second flag value is set;

when the vehicle is determined to be stopped, the vehicle door is in the closed state, and the second flag value is set, opening the vehicle door; and notifying the user, via the mobile device, whether the vehicle door is opened;

wherein notifying the user, via the mobile device, whether the vehicle door is opened includes:

monitoring an opening and closing state of the vehicle door after transmitting a request to open the vehicle door;

when the monitoring indicates that the vehicle door has changed to an open state within a predetermined second time period, determining that the vehicle door is opened; and when the monitoring indicates that the vehicle door has not changed to the open state within the predetermined second time period, determining that the vehicle door is not opened.

8. The vehicle door control method of claim 7, wherein determining whether the cargo compartment is mounted at the rear of the cab includes:

when a voltage value of a connector pin provided on the cargo compartment falls within a first range, determining that the cargo compartment is mounted at the rear of the cab; and when a voltage value of a connector pin provided on the cargo compartment falls in a second range different from the first range, determining that the cargo compartment is not mounted at the rear of the cab.

9. The vehicle door control method of claim 7, wherein detecting whether the digital key is closer to the vehicle by the predetermined first distance or less includes:

estimating a distance between the digital key and the short range communication terminal by using a Received Signal Strength Indicator (RSSI) value; and detecting whether the estimated distance is equal to or less than the predetermined first distance.

10. The vehicle door control method of claim 7, wherein notifying the user, whether the vehicle door is unlocked includes:

monitoring a locked state of the vehicle door after transmitting a request to unlock the vehicle door;

when the monitoring indicates that the vehicle door has changed to an unlocked state within a predetermined first time period, determining that the vehicle door is unlocked; and when the monitoring indicates that the vehicle door has not changed to the unlocked state within the predetermined first time period, determining that the vehicle door is not unlocked.

11. The vehicle door control method of claim 7, wherein notifying the user, whether the vehicle door is unlocked includes:

notifying the mobile device, via the short range communication terminal, whether the vehicle door is unlocked.

12. The vehicle door control method of claim 7, wherein notifying the user, whether the vehicle door is opened includes:

notifying the mobile device, via the short range communication terminal, whether the vehicle door is opened.

* * * * *